US008666727B2

(12) United States Patent
Hennecke (10) Patent No.: US 8,666,727 B2
(45) Date of Patent: Mar. 4, 2014

(54) VOICE-CONTROLLED DATA SYSTEM

(75) Inventor: Marcus Hennecke, Ulm (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1508 days.

(21) Appl. No.: 11/359,755

(22) Filed: Feb. 21, 2006

(65) Prior Publication Data

US 2007/0198273 A1    Aug. 23, 2007

(51) Int. Cl.
*G06F 17/28*        (2006.01)

(52) U.S. Cl.
USPC .................................................. 704/8

(58) Field of Classification Search
USPC .................................................. 704/8
See application file for complete search history.

(56) References Cited

U.S. PATENT DOCUMENTS

| | | | | |
|---|---|---|---|---|
| 5,040,218 | A * | 8/1991 | Vitale et al. ................ | 704/260 |
| 5,822,731 | A * | 10/1998 | Schultz ....................... | 704/270.1 |
| 6,411,932 | B1 * | 6/2002 | Molnar et al. .............. | 704/260 |
| 7,627,817 | B2 * | 12/2009 | Travieso et al. ............ | 715/264 |
| 8,401,840 | B2 * | 3/2013 | Kadirkamanathan et al. .... | 704/8 |
| 2002/0052740 | A1 * | 5/2002 | Charlesworth et al. ....... | 704/220 |
| 2003/0050779 | A1 * | 3/2003 | Riis et al. ................. | 704/236 |
| 2003/0086699 | A1 * | 5/2003 | Benyamin et al. .......... | 386/96 |
| 2003/0135369 | A1 * | 7/2003 | Stoimenov et al. .......... | 704/235 |
| 2003/0220790 | A1 * | 11/2003 | Kepuska ..................... | 704/241 |
| 2003/0229898 | A1 * | 12/2003 | Babu et al. ................. | 725/87 |
| 2003/0236912 | A1 * | 12/2003 | Klemets et al. ............. | 709/236 |
| 2004/0034518 | A1 * | 2/2004 | Rose et al. ................. | 704/1 |
| 2004/0039570 | A1 | 2/2004 | Harengel et al. ............ | 704/232 |
| 2004/0054541 | A1 * | 3/2004 | Kryze et al. ................ | 704/275 |
| 2004/0099126 | A1 * | 5/2004 | Kawashima .................. | 84/609 |
| 2004/0148154 | A1 * | 7/2004 | Acero et al. ................ | 704/1 |
| 2004/0148170 | A1 * | 7/2004 | Acero et al. ................ | 704/257 |
| 2004/0153311 | A1 * | 8/2004 | Liu et al. .................. | 704/10 |
| 2004/0158468 | A1 * | 8/2004 | Baker ....................... | 704/238 |
| 2004/0236575 | A1 * | 11/2004 | Goronzy et al. ............. | 704/231 |
| 2005/0033575 | A1 * | 2/2005 | Schneider ................... | 704/254 |
| 2005/0050457 | A1 * | 3/2005 | Kurumatani ................. | 715/513 |
| 2005/0154578 | A1 * | 7/2005 | Tong et al. ................. | 704/5 |

(Continued)

FOREIGN PATENT DOCUMENTS

| | | | |
|---|---|---|---|
| EP | 1291848 | A2 | 3/2003 |
| EP | 1300829 | A1 | 4/2003 |
| EP | 1291848 | A3 | 1/2004 |

OTHER PUBLICATIONS

Tony Vitale, An algorithm for high accuracy name pronunciation by parametric speech synthesizer, Sep. 1991, Digital Equipment Corporation, vol. 17 Issue 3, pp. 257-276.*

(Continued)

*Primary Examiner* — Jakieda Jackson
(74) *Attorney, Agent, or Firm* — Brooks Kushman P.C.

(57) ABSTRACT

A voice-controlled data system may include a data storage unit including media files having associated file identification data, and a vocabulary generating unit generating phonetic data corresponding to the file identification data, the phonetic data being supplied to a speech recognition unit as a recognition vocabulary, where one of the media files may be selected according to a recognized speech control command on the basis of the generated phonetic data, where the file identification data include a language identification part for identifying the language of the file identification data, and where the vocabulary generating unit generates the phonetic data for the file identification data of a media file based on its language identification part.

41 Claims, 8 Drawing Sheets

(56) References Cited

U.S. PATENT DOCUMENTS

| | | | |
|---|---|---|---|
| 2005/0197837 A1* | 9/2005 | Suontausta et al. | 704/260 |
| 2005/0201254 A1* | 9/2005 | Looney et al. | 369/124.01 |
| 2005/0256716 A1* | 11/2005 | Bangalore et al. | 704/260 |
| 2005/0257140 A1* | 11/2005 | Marukawa | 715/513 |
| 2005/0267757 A1* | 12/2005 | Iso-Sipila et al. | 704/260 |
| 2008/0052062 A1* | 2/2008 | Stanford | 704/8 |

OTHER PUBLICATIONS

H. Alvestrand, Tags for the Identification of Languages, Jan. 2001, Network Working Group, pp. 1-13.*

Jean Kumagai; Talk to the Machine; IEEE Spectrum; Sep. 2002; pp. 60-64.

* cited by examiner

Kate Ryan: | keIt | raI | @n |   enUS ⟶ 113

La Promesse: | lA | pRo | mEs |   frBE ⟶ 113

VOICE-CONTROLLED DATA SYSTEM

CROSS-REFERENCE TO RELATED APPLICATIONS

This application claims priority of European Patent Application Serial No. 05 003 672.2, filed on Feb. 21, 2006, titled VOICE-CONTROLLED DATA SYSTEM, which is incorporated by reference in this application in its entirety.

BACKGROUND

1. Field of the Invention

This invention relates to a voice-controlled data system and to a method for a voice-controlled selection of a media file stored on a data storage unit, and to a system and method for automatically detecting the language of file identification data of a media file.

2. Related Art

Recently, the use of media files that are available over a centralized database usable for a variety of users has become known. The use of audio or video files that are accessible via a communication network, e.g., the internet, using wired or wireless connections has become a widely spread phenomenon due to the fact that systems have been developed that allow the storing of audio and video data files in a compact way using different compression techniques. Furthermore, electronic music stores, e.g., iTunes® from Apple, Inc., provide databases comprising a large variety of different music files that can be bought and downloaded onto a personal data storage unit.

In the art, many different formats for storing these media data have been known, e.g., media data stored in a MP3 format, AAC format, WMA format, MOV format, and WMV format. Additionally, many formats also allow the storing of meta-data corresponding to the media file. These meta-data or meta-information comprise data, e.g., the title of the file, allowing the identification of the data, the artist, the year of record, the genre, the tracks, etc.

Additionally, the voice-controlled operation of multimedia systems is known in the art. Especially in vehicles, the voice-controlled operation of electronic systems comprising an audio module, a navigation module, a telecommunication module, and/or a radio module, is a useful feature for the driver that may, for instance, help the driver to focus on the traffic. To this end, speech recognition units are used in which a voice command from the user of the electronic system is detected and phonetic transcriptions of the detected voice command are used for executing the command of the user. The control of an electronic system comprising media files for the purpose of selecting one of the files is a difficult task because the speech recognition system has to recognize the speech input from the user, which may comprise variable vocabulary such as the name or the title of the media file.

Accordingly, there is need to provide an improved speech recognition unit that allows the speech-controlled selection of specific media files from a group of several media files. Additionally, there is a need to provide for processing the media files in such a way that the language of the media data can be determined in an effective way.

SUMMARY

According to an example of one implementation, a voice-controlled data system includes a data storage unit and a vocabulary generating unit. The data storage unit may include media files that may include associated file identification data. The file identification data may include a language identification part for identifying the language of the file identification data. The vocabulary generating unit generates phonetic data corresponding to the file identification data. The vocabulary generating unit may generate the phonetic data for the file identification data of a media file based on its language identification part. The phonetic data may be supplied to a speech recognition unit as a recognition vocabulary. One of the media files may be selected according to a recognized speech control command on the basis of the generated phonetic data.

According to an example of another implementation, a multimedia system includes a data system as just summarized.

According to an example of another implementation, a method is provided for the voice-controlled selection of a media file stored on a data storage unit. The data storage unit may include a plurality of media files which have respective file identification data. According to the method, voice data for selecting one of the media files are inputted. The voice data are supplied to a speech recognition unit. A language identification part included in the file identification data of the media files is extracted. Phonetic data corresponding to the file identification data are generated, based on the language information extracted from the language identification part. The generated phonetic data are compared to the input voice data by the speech recognition unit, and a corresponding speech control command is generated. A media file from the data storage unit is selected in accordance with the generated speech control command.

According to an example of another implementation, a system for automatically detecting the language of file identification data of a media file includes a data storage unit. The data storage unit may include media files. Each media file may include associated file identification data. The file identification data may include at least one data entry allowing the identification of a media file. The system also includes a language estimation unit for estimating the natural language of the at least one data entry of the media file, and a data processing unit for adding the estimated natural language to the file identification data.

According to an example of another implementation, a method is provided for detecting the language of file identification data of a media file. The file identification data may include at least one data entry allowing the identification of a media file. According to the method, at least one media file is selected out of a group of media files. The at least one data entry of the file identification data is retrieved. The natural language of the at least one data entry of the media file is estimated based on a statistical model. The estimated natural language is added to the file identification data.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
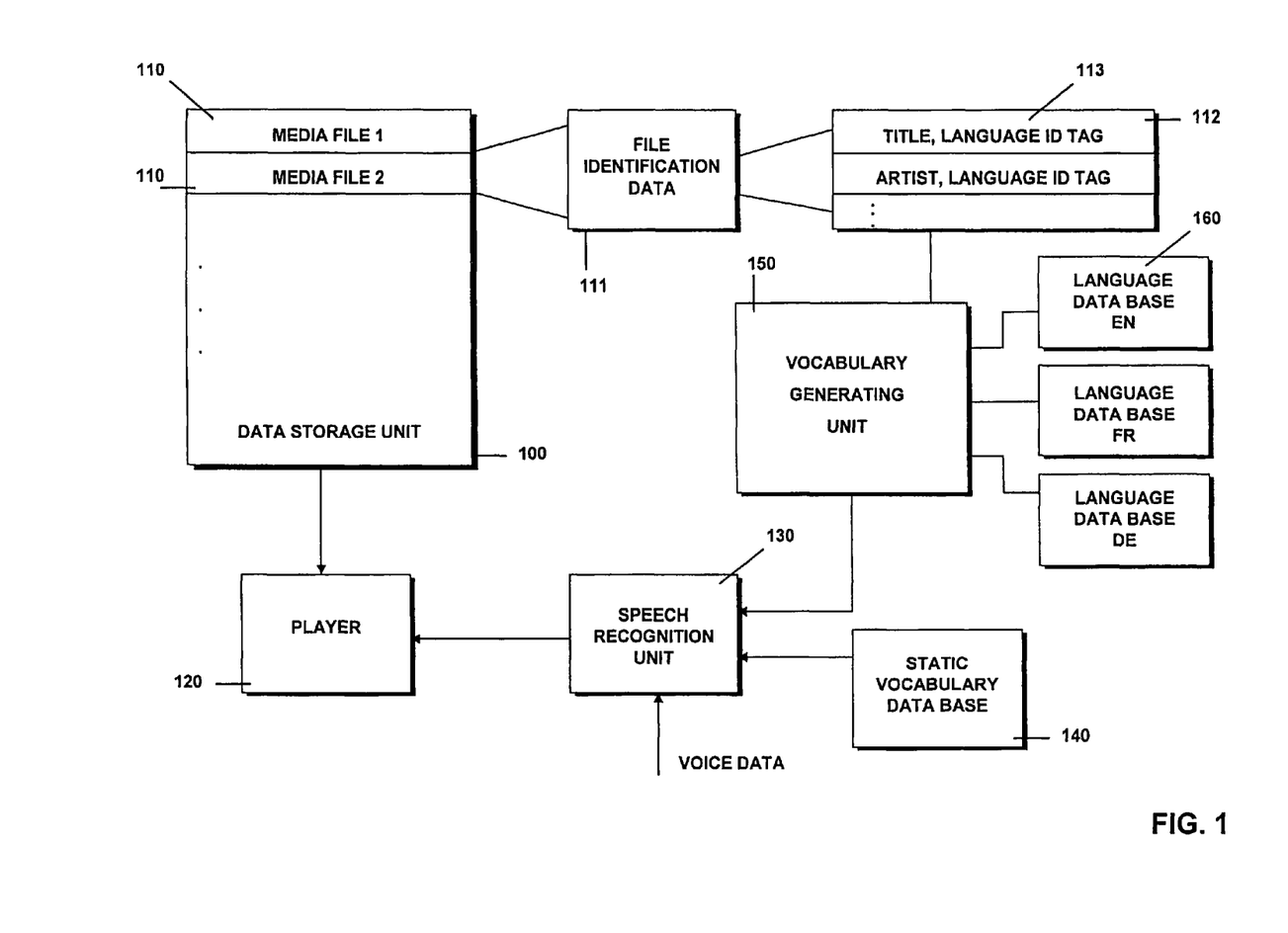
FIG. 1 is a schematic view of a voice-controlled data system according to an example of an implemention.

FIG. 1 is a schematic diagram illustrating an example of a voice-controlled data system 100 according to one implementation. The system 100 includes a data storage unit 105. The data storage unit 105 includes different media files 110. The media file 110 may include audio or video data and may be part of a compact disc or DVD or any other storage unit, e.g., an SD card, or any other storage medium for storing data. The data storage unit 105 may also include media files 110 that have been downloaded from an electronic music store, so that the media files 110 contained in the data storage unit 105 would depend on the individual preferences of the user. In this case, the media files 110 may be from different artists, e.g., the data storage unit 105 may have media files, e.g., songs from many different artists, and could also include titles of different genres, be it jazz, pop, classic, etc. The data storage unit 105 may be incorporated into a vehicle (not shown), but may also be utilized in a non-mobile environment.

For the identification of the different media files 110, each media file 110 has corresponding file identification data 111. The structure of the file identification data 111 may depend on the media files 110, i.e., on the way the media files 110 are stored on a data storage unit 105. Different ways of storing media file data have been known. The file identification data 111 may be part of a header of the media files 110. The file identification data 111 may be part of the media file 110, but they may also be stored in a separate file and they may be linked to the media files 110. If the media files 110 are stored in the MP3 format, the file identification data 111 may be stored in the ID3 format. By way of example, the language identification data 111 may be stored in the ID3v2 system, the ID3v2 system allowing storage of file related data of MP3 data. In general, the composition of the file identification data 111 will depend on the storing format of the data itself, be it MP3, AAC, WMA, MOV, WMV, or any other format.

The file identification data 111 of each media file 110 may include different data sets 112, each data set 112 including a data entry and the corresponding language ID tag. These data sets 112 help to recognize the media file 110 and may include, for example, information about the title of the file, the artist of the file, the genre of the file, the composer, the number of tracks, etc. Each data set 112 may include a language identification tag 113 that indicates the language of the information included in the data set 112. In the example shown in FIG. 1, the title including natural language may be an English title (e.g., "Singing in the Rain"). In this case, the language identification tag 113 would show the information that the title is an English language title. Furthermore, the data set 112 indicating the artist of a song of a media file 110 may be a proper name. This name also may include a language identification tag 113 that helps to correctly pronounce the name of the artist.

If a user of the data storage system wants to select one of the media files 110 included in the data storage unit 105, he or she may utilize commands such as "play [name of the title]" or "play [name of artist]". The correct media file 110 may be transferred to a media player 120, which will play the selected media file 110 in accordance with the voice data input into a speech recognition unit 130. The speech recognition unit 130 has to correctly identify the voice command input by the user of the system. This voice command normally includes an often utilized static vocabulary, e.g., commands like play, stop, go to, forward, backwards, etc. In order to correctly identify this vocabulary, the speech recognition unit 130 may have access to a static vocabulary database 140 that helps to identify the static vocabulary and provides the corresponding phonetic transcriptions.

In contrast to the static vocabulary, the voice command may also include variable vocabulary that depends on the content of the media file 110, e.g., the title of the media file 110, the artist of the media file 110, etc. The speech recognition unit 130 may need to recognize the static vocabulary and the variable vocabulary to generate the correct speech control command to be input into the player 120. To this end, a vocabulary generating unit 150 generates a phonetic transcription of the file identification data 111 of the media files 110. For the correct phonetic transcription of the different data sets 112 included in the file identification data 111, the language identification tags 113 are utilized, e.g., the title of the song may be "La Promesse". In this case, the language identification tag 113 indicates that the title is French. The vocabulary generating unit 150 then knows how to generate the phonetic transcription of the title. The singer of this title, Kate Ryan, has an English-pronounced name, so that the language identification tag 113 in this case will identify the artist as having an English-pronounced name. For generating the phonetic transcription of the different file identification data 111, the vocabulary generating unit 150 may access different databases 160, which may include phonetic information related or specific to a particular language such as phonetic transcriptions of terms of a certain language and/or phonetic rules of the language. In the implementation shown, three different language databases 160 are shown by way of example: an English language database, a French language database, and a German language database. For the phonetic transcription, the vocabulary generating unit 150 may utilize a computer readable phonetic alphabet such as SAMPA or IPA, which are known in the art.

It is also possible to generate the phonetic data before the user has input the speech control command. Every time a new media file 110 is present on the data storage unit 105, or every time the system is booted, the language identification part may be extracted and the phonetic data may be generated. When the user then selects a media file 110 using the control command, the already generated phonetic data may be utilized.

When the original language of the file identification data 111 is known, it is easier to generate the correct phonetic data of the file identification data 111. As can be seen in FIG. 1, the language identification tag 113 helps to identify the language of the different data sets 112 of the file identification data 111, so that the vocabulary generating unit 150 generates the correct phonetic transcription of the information included in the file identification data 111. The file identification data 111 may be utilized by the user of the system 100 for selecting one of the media files 110. The user may wish to play one of the media files 110 and will therefore utilize a voice command telling the system the name of the file or the artist of the file. The vocabulary generating unit 150 that generates the phonetic data is then able to correctly generate the phonetic data when the origin of the file identification data 111 is known. The phonetic transcription generated by the vocabulary generating unit 150 is fed to the speech recognition unit 130, which may utilize known speech recognition techniques in order to correctly identify the voice data or voice command input by the user of the system. The language identification tag 113 helps to create the correct vocabulary, which typically strongly depends on the media file 110 included in the data storage unit 100.

According to another implementation, the file identification data 111 may include data sets 112 of different languages. The different data sets 112 may be the title of the file, the composer, the author, the artist or the genre of the file, etc. All of these different data sets 112 may not necessarily be of the same language, e.g., the singer may have a French name, the title of the song may be German, Italian, Spanish, etc. Each of the data sets 112 may be utilized by the user for selecting one of the media files 110, so that the correct pronunciation of the different data sets 112 has to be known, i.e., the correct phonetic transcriptions of the different data sets 112 have to be generated. The title of the song may be French, e.g., "la Promesse", while the singer Kate Ryan has an English-pronounced name. For the generation of the correct phonetic data, the language of each data set 112 has to be known, so that the correct phonetic data of the title, of the artist or of the author of the file may be generated.

According to another implementation, a multimedia system is provided that includes a data system 100 as mentioned above. The multimedia system may, for example, be incorporated in a vehicle dashboard. Implementations of the multimedia system may include many electronic modules, e.g., an audio module, a video module, a telecommunication module, and/or a navigation module. Particularly in vehicles, the voice-controlled operating of electronic systems may be implemented, and may help the driver to concentrate on the traffic. The driver does not need to operate different operating buttons and may, therefore, concentrate on the traffic, when speech recognition systems are utilized in the multimedia system.

Figure 2:
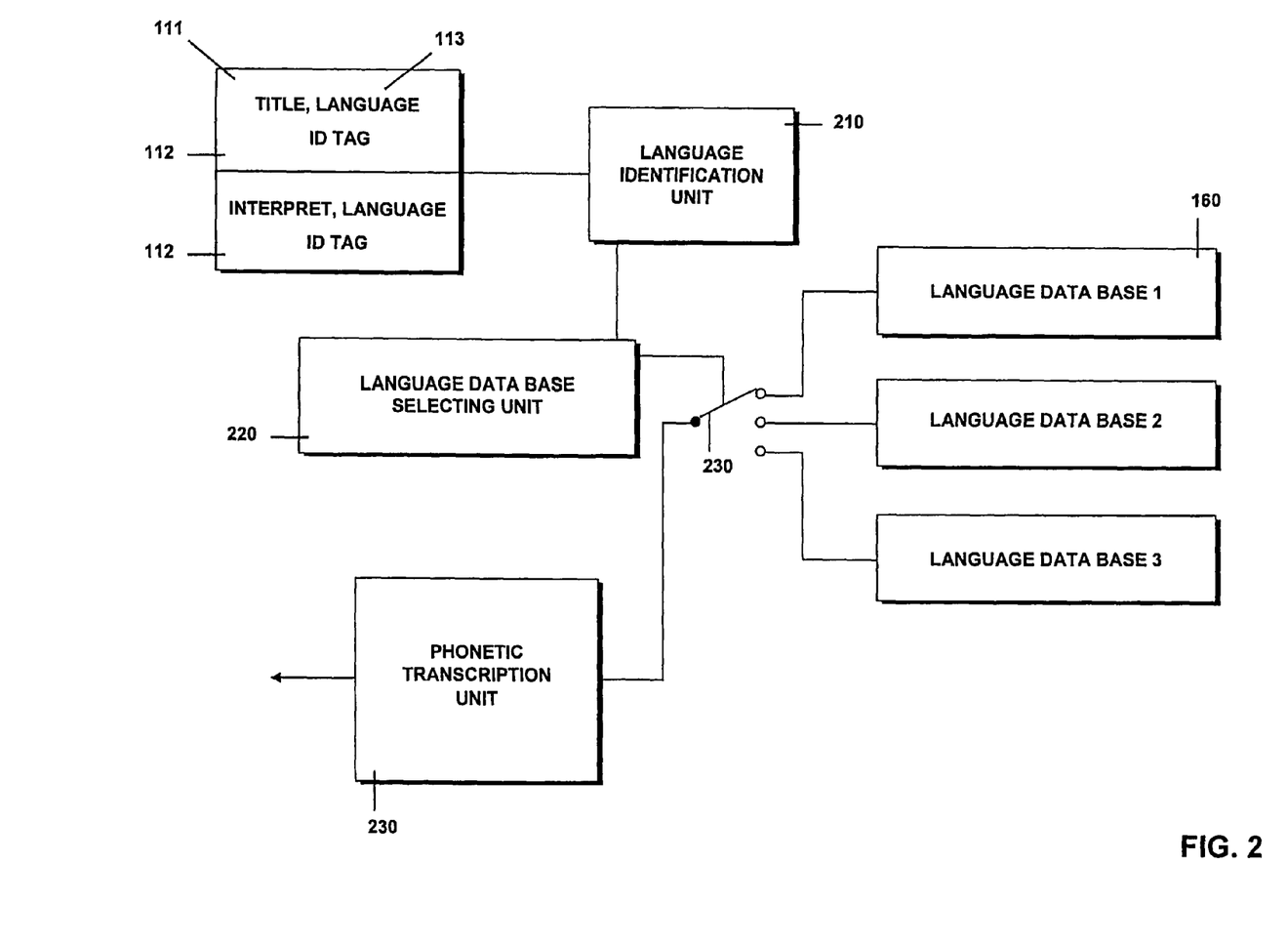
FIG. 2 is a schematic view illustrating in detail part of the system of FIG. 1.

FIG. 2 is a schematic diagram illustrating an example of a part 200 of the data system 100, in which an example of the functioning of the vocabulary generating unit 150 is shown in further detail. A language identification unit 210 extracts the language identification tag 113 out of the data set 112 and transmits the language identification tag 113 to a language database selecting unit 220. The language database selection unit 220 selects one of the databases 160 in accordance with the language identification tag 113 extracted from the file identification data 111. The language database selection unit 220 may control a switching unit 230, and selects the database 160 that includes phonetic rules and/or a phonetic transcription of different terms of the particular language identified by the language identification unit 210. The language identification tag 113 identifies the language of the corresponding file identification data 111, and abbreviations, e.g., DE for German, FR for French, etc. may be utilized. One possibility of classifying the different languages by the language identification tag 113 may be by using Norm ISO 639-2. In this ISO-norm, the different languages are encoded by two or three characters. The language identification tag 113 included in the file identification data 111 may help to correctly determine the language that should be utilized for generating the phonetic data corresponding to the file identification data 111.

A phonetic transcription unit 230 produces the phonetic data of the information included in the file identification data 111, i.e. of the title of the artist, etc. The phonetic transcription unit 230 transfers the generated phonetic data to the speech recognition unit 130 of FIG. 1, which may then utilize known recognition techniques, such as dynamic time warping, dynamic programming, or a statistical modeling technique, such a hidden Markov models. The functioning of speech recognition units is well known in the art and, for the sake of clarity, a detailed description of such functioning is omitted as it is not needed for the understanding of the implementations described in this disclosure.

The file identification data 111 of the media file 110 may include at least one natural language term. In the present context, "natural language term" indicates a language utilized for communicating between human beings, and does not mean computer-programming language utilized to instruct computer systems. The media files 110 may include audio or video files, and the file identification data 111 may include at least one of the following types of information: title of the file, composer or author of the file, artist of the file, and/or genre of the file, etc . When the user of the data system wants to select one of the media files 110, he or she will probably utilize the artist or composer or title of the media file 110 in the case of an audio file. For example, the user may wish to select a media file 110 on the data storage unit 105 including files of Tina Turner or Edith Piaf. For a voice-controlled operation the user may utilize the voice command "play Tina Turner" or "play Edith Piaf", possibly followed by the title of the respective media file 110. The speech recognition unit 130 now has to recognize the input voice data. This is normally done by comparing the input voice data to phonetic data generated from the file identification data 111, i.e., of the title of the media file 110 or of the artist of the media file 110. The language identification unit 210 extracting the language identification tag 113 helps to determine the correct pronunciation of the file identification data 111 by using the language identification part for generating the phonetic data. The vocabulary generating unit 150 generates the correct phonetic data of the media file 110, and the phonetic data is then utilized by the speech recognition unit 130 for determining the content of the voice command of the user of the system.

Instead of selecting one media file 110 out of a group of media files 110, it is also possible to select one chapter out of several chapters of one media file 110 (e.g., to select one chapter of a DVD where the video file is composed of several chapters).

The system may, furthermore, include a language database selecting unit 220 that selects a language database 160 in accordance with the extracted language identification tag 113. The data system normally accesses databases including phonetic transcriptions and phonetic rules of a language. The language identification tag 113 helps to select the correct language database 160. For the correct pronunciation of an English phrase, the English language database including phonetic transcriptions of English terms and/or including English phonetic rules is needed, for the correct pronunciation of a French or German term, a French or German database has to be utilized, etc.

For further supporting multilingual speech recognition, a multilingual speech recognition means may be provided, e.g., by providing a plurality of (parallel) speech recognition units 130 operating in different languages, or by providing a multilingually trained speech recognition unit 130 that is able to recognize words or phonemes from different languages. In the first case, the plurality of speech recognition units 130 may be supplied with the corresponding phonetic data generated in the different languages. For instance, a speech recognition unit 130 configured to recognize German may be supplied with the phonetic transcriptions for file identification data that is tagged for German, a French speech recognition unit 130 receives the phonetic transcriptions for French file identification data, etc. On the other hand, a multilingually trained speech recognition unit 130 may be supplied with all phonetic data for all file identification data 111 irrespective of the individual language identification data. The multilingually trained speech recognition unit 130 may be trained on speech data which includes data from all languages that are utilized in the data system. As an alternative, the different phonetics of the utilized languages may be mapped to the language of the speech recognition unit 130. In other words, the phonemes of phonetic transcriptions in foreign languages may be mapped to the native phonemes of the speech recognition unit 130 to allow the single language speech recognition unit 130 to recognize file identification data 111 having phonetic transcriptions in a different language.

Figure 3:
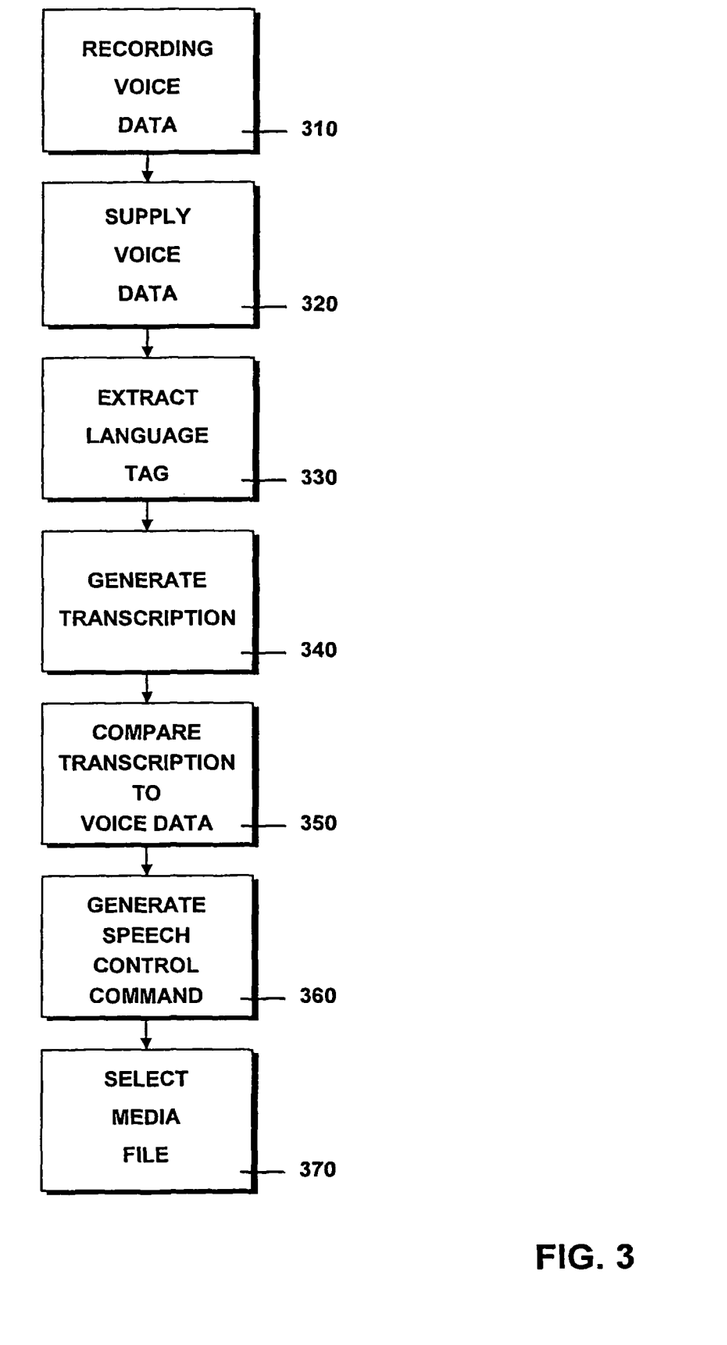
FIG. 3 is a flowchart showing the different steps for a voice-controlled selection of a media file according to an example of an implementation.

FIG. 3 is a flowchart in which the different steps for the voice-controlled selection of a media file 110 (FIG. 1) are shown as an example of one implementation. In a first step 310, the voice data of the user of the system including the voice command are input or recorded. In a next step 320, the voice data are supplied to the speech recognition unit 130 (FIG. 1). Additionally, the language identification tag 113 (FIG. 1) is extracted from the file identification data 111 to determine the language of the file identification data 111, in step 330. Now the language of the terms included in the file identification data 111 is known, so that the phonetic transcriptions corresponding to the file identification data 111 based on the language information extracted from the language identification part may be generated in step 340 for the recognition of the voice data in the speech recognition unit 130, such as by accessing a language database including phonetic transcriptions and/or including phonetic rules of a language. Moreover, if the system works with different language recognition units, the language identification data may help to select the language recognition unit. In step 350, the phonetic transcription generated in step 340 is compared to the voice data. In step 360, the speech recognition unit 130 (FIG. 1) then generates a speech control command for the media player 120 by using, for example, speech recognition techniques known in the art. In step 370, an appropriate media file 110 is selected from the data storage unit 105 (FIG. 1) in correspondence with the generated speech control command. The language identification data, i.e., the language identification tag 113, helps to produce the correct phonetic transcription of the natural language term(s) included in the file identification data 111, so that the correct phonetic transcriptions may be obtained and the voice command or the voice data for selecting one of the media files 110 may be more easily accessed or produced by the speech recognition unit 130. As a consequence, the voice-controlled handling of a selection of a media file 110 may be improved. Alternatively, the steps 330 and 340 for generating the correct phonetic transcriptions may also be performed before the voice data are input in steps 310 and 320. The recognition vocabulary may be prepared in advance and stored until the system is utilized by inputting a voice command.

Implementations described in this disclosure are not limited to the selection of one media file 110. It should be understood that at least one media file 110 may be selected. For instance, in a case where the user inputs the command "play [name of the artist]", the system may also select all files of the artist.

Furthermore, it is possible that the file identification data 111 (FIG. 1) include data sets 112 of different languages. As a consequence, the file identification data 111 may include corresponding language identification tags 113 for each data set 112. For generating the phonetic data of the individual data sets 112, different language databases corresponding to the different language identification tags 113 may be accessed. For instance, the title of the file may be English, the artist of the file may be French, or vice versa.

Summarizing, phonetic data corresponding to file identification data 111 of a media file 110 may be generated by applying phonetic rules of the language identified by the corresponding language identification part on natural language text stored in the file identification data 111. The conversion of the generated phonetic data to the speech control command may be performed by pattern matching techniques applied in the speech recognition unit 130, e.g., dynamic time warping, dynamic programming, or statistical modeling techniques, e.g., hidden Markov Models. The voice data may be compared to the phonetic data from the vocabulary generating unit 150 and, as a result of the comparison, a speech control command may be generated which is fed to a media player 120 where the media file 110 may be reproduced.

Figure 4:
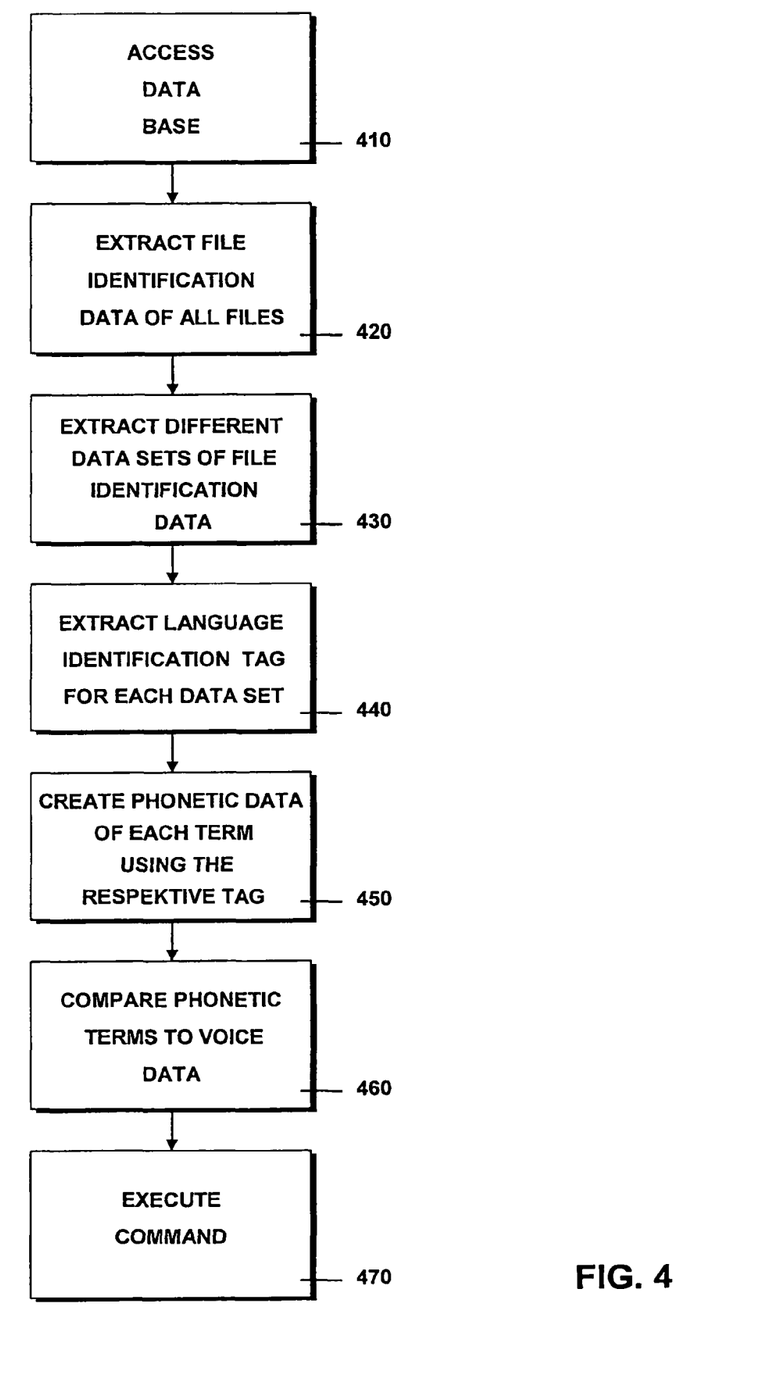
FIG. 4 is a flowchart showing another implementation for selecting a media file.

FIG. 4 is a flowchart in which an example of another implementation for selecting a media file is shown. In a first step 410, a database is accessed. The database may include or be part of a data storage unit 105 as shown in FIG. 1. In a next step 420, the file identification data 111 (FIG. 1) all files included in the database are extracted. The file identification information included in the file identification data 111 has to be known, so that the different sets of each file identification data 111 are extracted in step 430. For the correct phonetic transcription of the different terms of the data sets 112 (FIG. 1), the language identification tags 113 are extracted for each data set 112 in step 440. In a next step 450, the phonetic data of each term of the data set 112 is created by using the respective language identification tags 113. As mentioned above, the language of each data set 112 is not necessarily the same (cf. above the song "La Promesse" of Kate Ryan). The user will probably know the pronunciation of the file identification data 111, the pronunciation depending on the language. To this end, the language of the information included in the file identification data 111 has to be known. After phonetic transcriptions have been made, they are compared to the voice data input into the system in step 460, and the input voice control command may then be executed in step 470.

Figure 5:
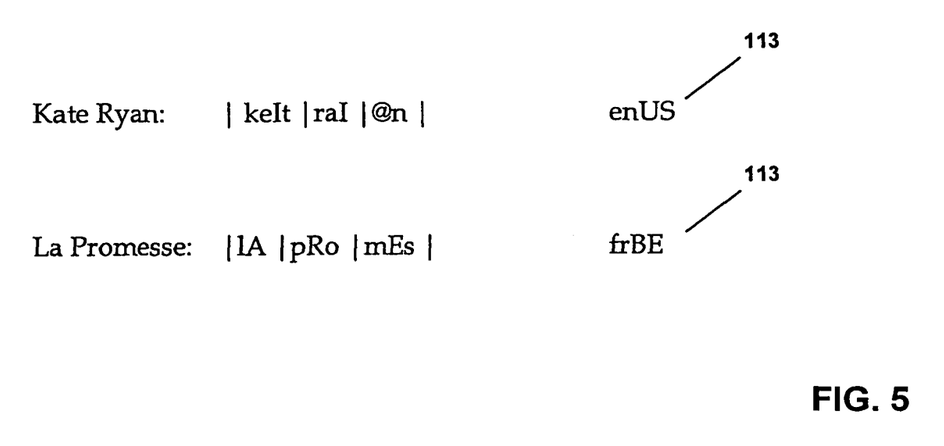
FIG. 5 is an example of a phonetic transcription.

FIG. 5 is an example of a phonetic transcription of the name Kate Ryan and of the title of her song "La Promesse" in SAMPA. Additionally, the language identification tags 113 are shown. In the example shown, "enUS" indicates that the singer has an English name (en), and "frBE" indicates that the Title is French (fr). Using the tags 113, the correct phonetic transcription may be obtained.

Figure 6:
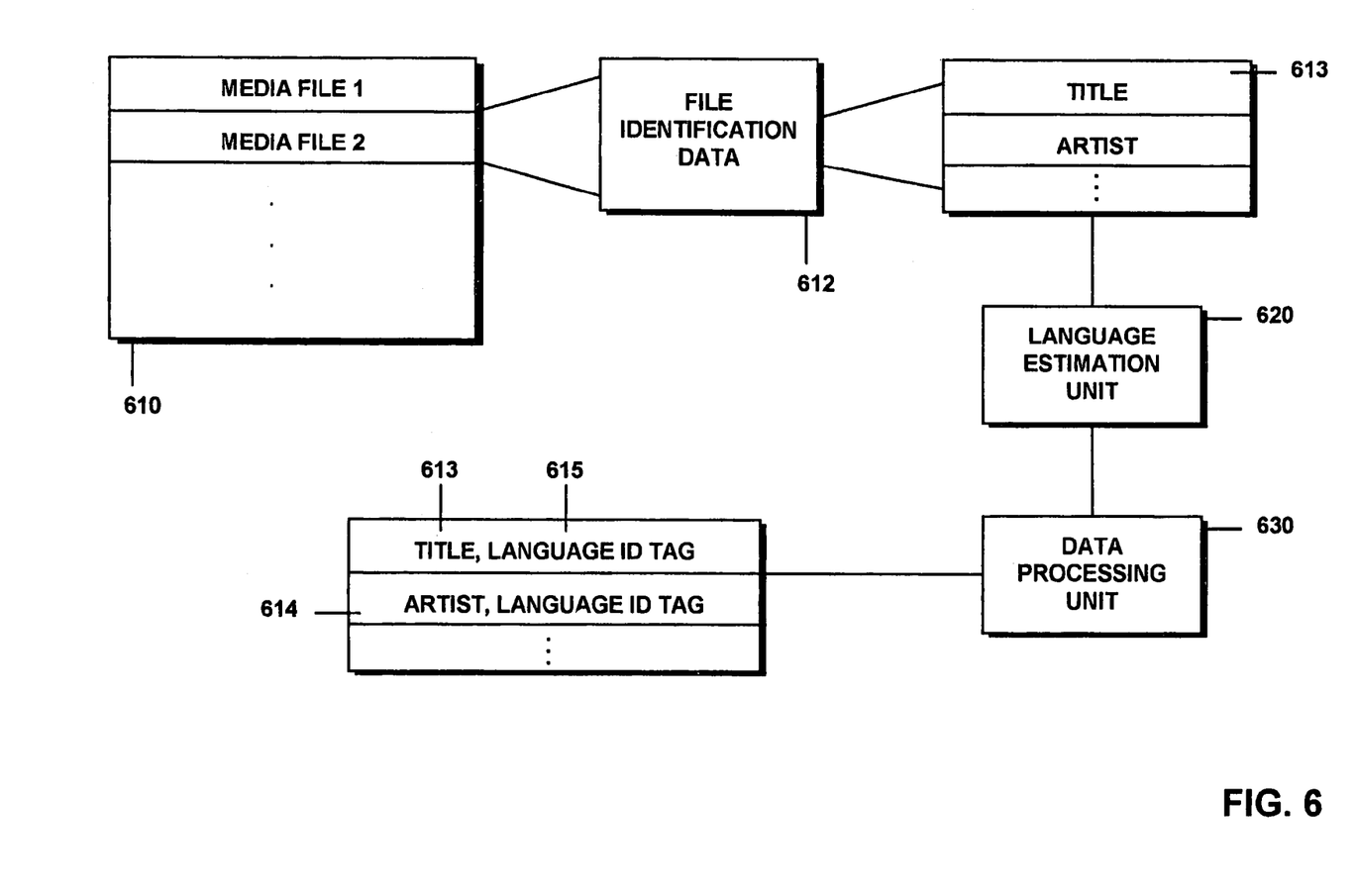
FIG. 6 is a schematic view of a system for automatically determining the language of a file identification data of a media file according to an example of another implementation.

The language identification tag 113 such as depicted in FIG. 5 has to be somehow incorporated into the identification data. FIG. 6 is a schematic diagram of a system 600 for automatically determining the language of the file identification data. In FIG. 6, the system 600 may include. a data storage unit 610 that includes different media files 611. In many data storage formats such as the digital data stream of a compact disc, the media files 611 do not include file identification data. If a user ripped the media files 611 included on a compact disc for storing the media files 611 in another format such as an MP3 format or any other compressed data format, it may be difficult to select a media file 611 using voice commands, as no information may be included in the media file 611 allowing the identification such as the artist or the title of the file 611. To generate file identification data 612, databases may be accessed that include the additional file identification data 612. One example of a commercially available database is the Gracenote database. As already described in connection with FIGS. 1 and 2, the file identification data 612 may include information such as the title or the artist in different data entries 613. However, in these data entries 613 the language ID may not normally be incorporated.

In other examples of the data storage unit 610, the file identification data 612 may already be present in the media file 611 and need not be transmitted from other databases. When the media file 611 is present having the file identification data 612 such as title and artist, the natural language of the title and the artist is not yet known. A user could determine the language for each data set of the data storage unit 610 and manually add the respective language information to each entry of a data set, but this would be a very time-consuming task. For instance, databases including a large variety of audio data may include several million audio data or several million albums, each album typically including several tracks, i.e., media files. For automating this adding of the language ID in a reliable manner, a language estimation unit 620 may be provided that estimates the language based on the information contained in the file identification data 612. These language estimation units 620 extract the data entries 613, e.g., the title, such as "Singing in the rain" or the name of the artist such as George Michael, and determine the respective natural language of the data entries 613. The determined natural language is then fed to a data processing unit 630 that adds the language ID tag 615 estimated by the language estimation unit 620 to the respective data entry 613. When the data processing unit 630 has added the language to the file identification data 612, which includes different data sets 614, each data set 614 includes a data entry 613 such as the title or the artist and the corresponding language ID tag 615. In the art, language estimation units are known which are able to estimate the language of a written character string. These language estimation units may now be utilized in combination with the file identification data 612 and may estimate the natural language of the data entry 613.

As has been discussed above, the file identification data 612, in the present case the data entry 613, may include at least one of the following information: artist of the media file 611, title, composer, recording year, genre, etc. These language estimation systems have a certain accuracy by identifying the correct language. Particularly in connection with the name of the artist, it is sometimes difficult to identify the language of the name of the artist. This may be also true for the title of the media file 611. By way of example, the name "George Michael" is a name which could originate from different languages. In this example, the name could be an English name, a French name, or a German name. Accordingly, the language estimation unit 620 may only estimate the correct natural language with a certain likelihood. To increase the accuracy, or increase the likelihood that the language estimation unit 620 estimated the correct natural language, the language estimation unit 620 may utilize a statistical model and take also into account identification data of other media files 611 and/or take into account data entries 613 of the media file 611 for which the language of a data entry 613 has to be determined. The use of information stored in other media files 611 or the use of information stored in the file identification data 612 of the media file 611 itself may help to increase the likelihood that the correct natural language for a data entry 613 such as the name of the artist or the title of the media file 611 is correct. This is due to the fact that, in case of statistical models, the more impact data are utilized with which the language may be determined, the higher the likelihood is that the estimated language is correct.

Figure 7:
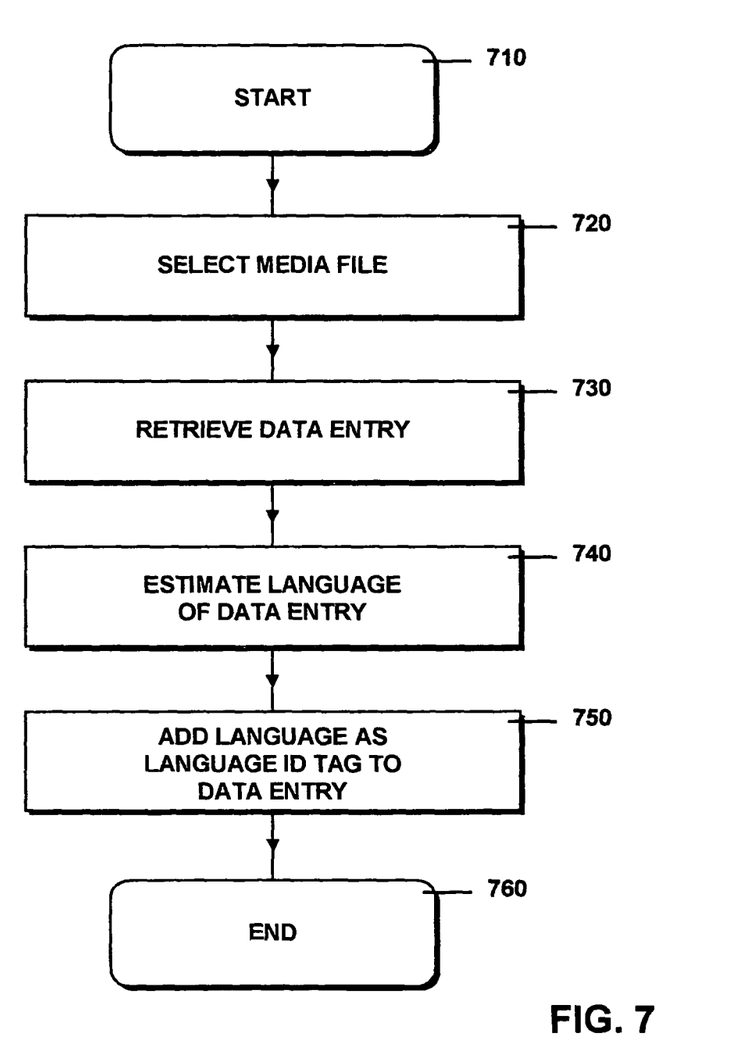
FIG. 7 is a flow chart showing the different steps for detecting the language.

FIG. 7 is a flowchart illustrating an example of the basic steps that may be carried out for determining the natural language ID. The process starts in a step 710. In a first step 720, the media file 611 (FIG. 6) is selected for which the language of the file identification data 612 should be estimated. In step 730, the data entry 613 (FIG. 6), such as the title or the artist, is retrieved for the file identification data 612. In step 740, the natural language of the data entry 613 is determined by, for example, utilizing a statistical model as will be explained below, and the determined language is then added to the data entry 613 in step 750. The process ends in step 760. In order to increase the likelihood for estimating the correct language of the file identification data 612, other media files 611 or data entries 613 of the selected file identification data 612 of the media file 611 are taken into account.

Figure 8:
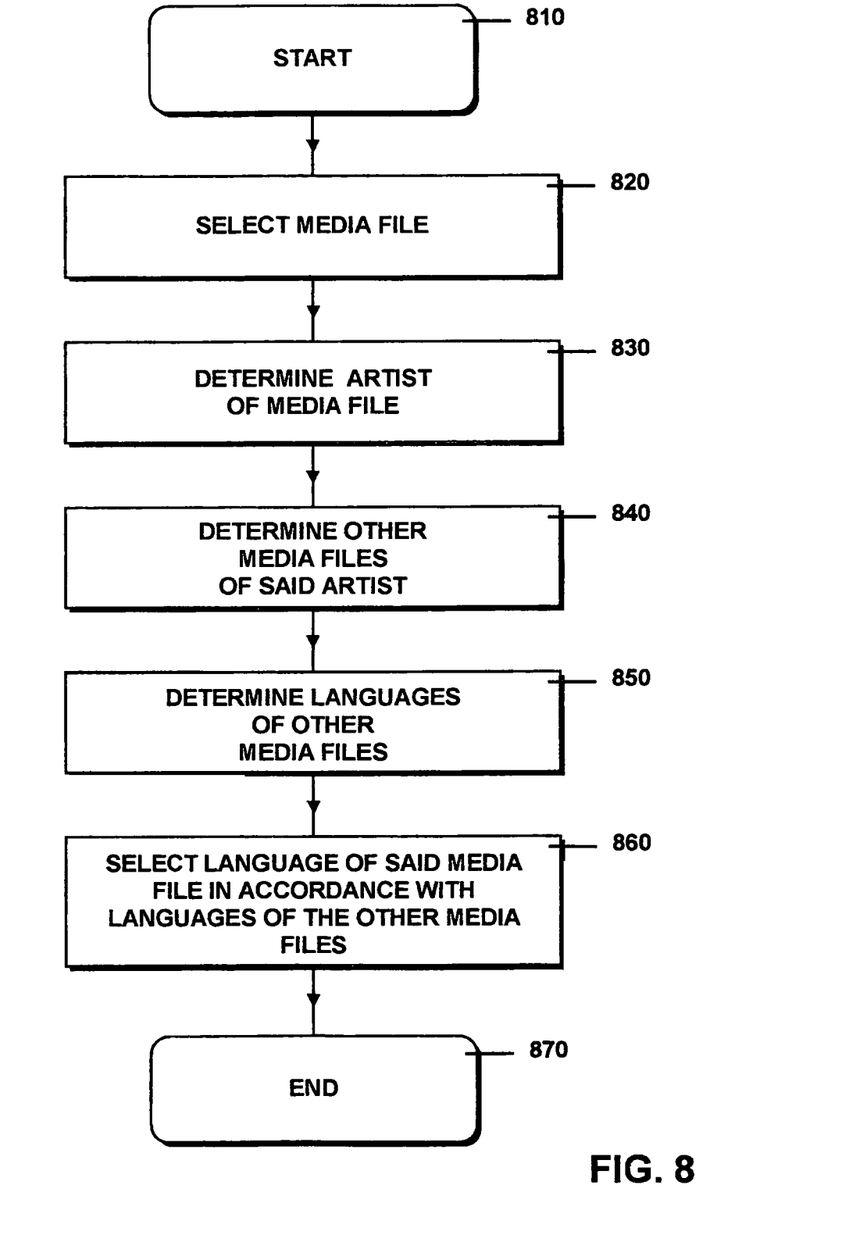
FIG. 8 is another flow chart showing the steps for detecting the language of a media file.

FIG. 8 is a more detailed flow chart for selecting the language of a data entry 613 (FIG. 6). In the case of names or short titles, the estimated language will often be incorrect. To improve the likelihood that the language estimation unit 620 (FIG. 6) determines the correct language, additional information of the artist or of the media file 611 may be utilized. In the implementation shown in FIG. 8, media files 611 of the same artist are taken into consideration for determining the correct language. The method starts in step 810. In step 820, the media file 611 is selected for which the language of the file identification data 612 (FIG. 6) should be determined. To do so, the artist itself may first be determined in step 830 by retrieving the information from the corresponding data entry 613. In a next step 840, other media files 611 of the artist are determined. In step 850, the language of the other media files 611 may be determined and, in step 860, the language-determining step 850 may be utilized for the media file 611 selected in step 820. In connection with step 850, it is possible to estimate the languages of the title or the language of an album or an artist. This may be done for all the other media files 611 of the artist or for at least some of the other media files 611 of the artist included in a database. If the result of step 850 is that a majority of the media files 611 have file identification data 612 of a first predetermined language, this predetermined language may be utilized for determining the language of the media file 611 selected in step 820. Artists often utilize one single language in their songs. In rare cases two different languages are utilized. Accordingly, if the language is estimated for all the titles or all the albums, there is a high likelihood that the language that was estimated in most of the cases is the language for all of the media files 611.

According to one implementation, the transfer of the estimated language to all or other media files 611 may be made dependent on the likelihood that the estimated language is correct. To this end, a score may be determined or calculated for each estimated language, the score indicating the concordance of a data entry 613 (FIG. 6) with one language. Each language has its characteristic sequence of characters. The score indicates whether a data entry 613 such as the title or the name fits well the characteristics of a certain language. For instance, the score may be utilized to indicate to what extent the file identification data 612 match an estimated natural language. In a statistical model, the data entry 613 such as the title or the name of the artist may be compared to different languages, and a value may be determined as to how good the processed data entry 613 is in agreement with the structures and rules of a certain language. The score indicates whether an estimated data entry 613 fits into the pattern or grammatical rules of a certain language. By way of example, for the name of Michael a high score could be obtained when the string Michael is compared to German, English or French language models. A high score means that the data entry 613 fits well into a scheme of a sequence of characters which is characteristic for a predetermined language.

Additionally, a confidence-based approach may be utilized in which a confidence value is determined for each determined language. In most of the cases, the language estimation unit 620 (FIG. 6) utilizes a statistical model by comparing the data entry 613 to different languages. The most likely language, e.g., the language having the highest score, may be utilized as estimated language. The confidence value may indicate how sure the language estimation unit 620 is that the correct language was identified. A high confidence value indicates that the system estimating the language has identified the correct natural language of the data entry 613. For determining the language of the other media files 611 (FIG. 6) in step 850, all the data entries 613 of the media files 611 may be connected to one large combined data entry, and the language may be determined for the combined data entry. Additionally, it is possible to separately estimate the language for each data entry 613 and to select the language which was estimated in most of the cases. Additionally, the score resulting from each estimation may be utilized, and the different scores for the different media files 611 may be combined in order to select the correct language.

The difference between the score and the confidence value will now be explained by way of example. In the above-mentioned example of "George Michael", the language estimation unit 620 would generate a high score for the languages German, English, and French. Due to the fact, however, that three different languages are likely to be correct, the confidence value in this example is low, as the system cannot be sure that the correct natural language of the data entry 613 was determined.

If in another example a high score is obtained only for one natural language, when the data entry 613 is compared to possible different languages, the confidence value may also be high, as this time there is a high likelihood that the correct natural language was determined. Accordingly, the confidence-based approach may utilize the calculated score for estimating the language of a data entry 613.

Often the estimation of the language of the name of the artist of the media file 611 is the most difficult case. To correctly identify the language of the name of the artist, the language of the title of the media file 611 may be determined, and the determined language of the title may also be utilized for the language of the artist. In the above-mentioned example this means that when the title of a song of George Michael is recognized as being an English title, the name of the artist may also be interpreted as being an English name.

Additionally, it is possible to utilize the other media files 611 of an artist for increasing the likelihood of the correct language. To this end, other media files 611 of an artist may be identified and the languages of the titles of the other media files 611 may be estimated. The language of the name of the artist is then determined based on the estimated languages of the other media files 611. The above-mentioned examples show that the other media files 611 may help for determining the language of a name of an artist.

The other titles of an artist may also be utilized for determining the language of a title of one of the media files 611 of the artist. To do so, the artist of a first media file 611 may be determined in a first step. In a second step, the other media files 611 of the artist may be determined, and the languages of the other media files 611 of the artist may be estimated, so that the language of the first media file 611 may be determined based on the estimated languages of the other media files 611. Normally, an artist utilizes one language in which a song is written. In some cases, an artist may utilize two different languages. Accordingly, if the languages of all the media files 611 of the artist are determined, the language of one or perhaps two languages of the artist is also valid for the first media file 611. By way of example, the most estimated language of the other media files 611 may be utilized as language of the first media file 611. Furthermore, it is possible that the use of the language of the other media files 611 depends on the determined score or the determined confidence value. If the confidence value is high or is larger than a predetermined value for a first language, this language may also be utilized for the first media file 611.

Furthermore, it is possible to combine all titles of the media files 611 of the artist into a new combined title string and to estimate the language for the combined title string. The estimated language is then utilized for the language of the data entry 613 of the first media file 611. This method is based on the fact that the larger the data string, the better the accuracy of the language estimation.

Furthermore, it is possible that for estimating the language of the first media file 611, the score of each estimated language for the other media files 611 is determined, where the scores of each determined language are combined, the language having the highest score being utilized as language for the first media file 611. For determining the language of the file identification data 612, only one data entry 613 such as the title or the name of the artist may be utilized. However, it is also possible to determine the language of several data entries 613 and to determine the language based on the several estimated languages.

According to another implementation, it is determined whether a predetermined title of a media file 611 is present for different artists. In a further aspect, the data files of the data storage unit 610 may be ranked depending on the determined confidence value. As explained above, large databases such as Gracenote exist having several millions of media files. When it is desired that the language identification tags 615 be added to each data entry 613 of the file identification data 612, this processing is a very time-consuming task. According to this aspect, the adding of the language ID may be carried out automatically. Due to the fact that the automatic estimation of the language cannot be done with a 100% accuracy, a user has to look over the processed data and has to verify the estimated languages by hand. When the data files are now arranged depending on the determined confidence value, the data files may be arranged in such a way that the data files having a low confidence value are first presented to the user. The user may then check these data files and may check whether the determined language was correctly determined. Accordingly, these aspects help to speed up the processing of the data. When a media file 611 was determined having one title and which is present for different artists of different languages, this media file 611 may also be ranked with a low confidence, so that the user may verify the estimated language.

In the implementation of FIG. 8, the information of other media files 611 (FIG. 6) are taken into account. However, it is also possible to consider other data entries 613 (FIG. 6) of the media file 611 for which the language should be selected. By way of example, if the language of the name of the artist is to be determined, the language of the title may be determined first, and the determined language may then also be utilized for the language of the name of the artist. It should be understood that the selection may also be made dependent on the determined score or confidence values.

Summarizing, the implementations shown in FIGS. 5-8 may help to correctly identify the language of a file identification data of a media file, and may increase the likelihood that the correct languages are estimated and added to the file identification data.

In conclusion, implementations described in this disclosure may help to provide a speech control system that utilizes the information of the language identification data for the correct generation of the voice control command that is fed to the media player, which selects the media file in correspondence with the input voice data.

While various examples of embodiments or implementations of the invention have been described, it will be apparent to those of ordinary skill in the art that many more embodiments or implementations are possible within the scope of this invention. Accordingly, the invention is not to be restricted except in light of the attached claims and their equivalents.

What is claimed is:

1. A voice-controlled data system comprising:
a data storage unit configured to store a plurality of media files;
a vocabulary generating unit configured to generate multilingual phonetic data corresponding to each of the media files;
a speech recognition unit configured to recognize a speech control command;
a processor configured to select a media file from the media files based on a comparison of a part of the speech control command and the generated multilingual phonetic data corresponding to the media files, where the multilingual phonetic data corresponding to any one of the media files comprises a phonetic representation of each data field of multilingual file identification data in a header section of the media file, and where the phonetic representation of each data field is based on a language identifier associated with said each data field of the multilingual file identification data in the header section; and
a media playback unit configured to play the selected media file.

2. The data system of claim 1, further comprising: at least one language database including phonetic rules and phonetic transcriptions of terms of a plurality of languages.

3. The data system of claim 1, further comprising a language identification unit configured to extract the language identifier from a data field of the multilingual file identification data in the header section of the media file.

4. The data system of claim 3, further comprising a language database selecting unit, executable by the processor, configured to select a language database from a plurality of language databases in accordance with the extracted language identifier.

5. The data system of claim 1, where the multilingual file identification data includes at least one natural language term.

6. The data system of claim 1, where the media files include audio or video files, and the multilingual file identification data of the media file comprises a title of the media file, a composer of the media file, an author of the media file, an artist of the media file, and a genre of the media file.

7. The data system of claim 1, where the media file player is further configured to operate based on the speech control command.

8. The data system of claim 1, where the multilingual file identification data include data sets of different languages.

9. A multimedia system comprising the data system of claim 1.

10. The data system of claim 1, where the multilingual phonetic data comprises a first phonetic representation and a second phonetic representation, where,
the first phonetic representation is generated according to a first language indicated by a first language identifier associated with a first data field of the multilingual file identification; and
the second phonetic representation is generated according to a second language indicated by a second language identifier associated with a second data field of the multilingual file identification.

11. A method for the voice-controlled selection of a media file stored on a data storage unit, the data storage unit including a plurality of media files, the media files including respective file identification data, the method comprising:
receiving voice data indicative of selection of the media file from among the media files, and supplying the voice data to a speech recognition unit;
extracting, by a processor, a first language identification tag included in the respective file identification data of each of the media files, the first language identification tag indicating a first language associated with a first data field of the respective file identification data, where the respective file identification data is in a header section of each of the respective media files;
extracting, by the processor, a second language identification tag included in the respective file identification data of each of the media file, the second language identification tag indicating a second language associated with a second data field of the respective file identification data in the header section of each of the respective media files;
generating, by the processor, phonetic data corresponding to the file identification data for each of the media files, the generated phonetic data comprising phonetic representations of the first data field and the second data field that are generated based on the first language identification tag and the second language identification tag, respectively;
comparing, by the processor, the generated phonetic data to the received voice data by the speech recognition unit and generating a corresponding speech control command; and
selecting, by the processor, the media file from the data storage unit in accordance with the generated speech control command.

12. The method of claim 11, where generating the phonetic data includes accessing a plurality of language databases that include phonetic transcriptions of a respective language, where the language databases are accessed in accordance with at least one of the first language identification tag or the second language identification tag.

13. The method of claim 11, where generating the phonetic data includes accessing at least one language database including phonetic rules of a language, and the language database is accessed in accordance with at least one of the first language identification tag or the second language identification tag.

14. The method of claim 11, where the file identification data of the media file includes a name of an author of the media file, and the generated phonetic data being a phonetic representation of the name of the author.

15. The method of claim 11, where the file identification data of the media file includes a title of the media file, and the generated phonetic data being a phonetic representation of the title.

16. The method of claim 11, further comprising transferring the selected media file to a media file player where the selected media file is reproducible.

17. The method of claim 11, where generating the phonetic representation of the first data field includes applying phonetic rules of the first language identified by the first language identification tag on natural language text stored in the file identification data.

18. The method of claim 11, further comprising converting the generated phonetic data to the speech control command by a pattern matching technique applied in the speech recognition unit.

19. The method of claim 18, where the pattern matching technique includes a technique selected from the group consisting of dynamic time warping, dynamic programming, a statistical modeling technique, a hidden Markov Model, and combinations of two or more of these.

20. A system comprising:
a data storage unit configured to store a plurality of media files, where each media file includes file identification data in a header section, the file identification data includes a first data entry containing a first natural language term and the file identification data further includes a second data entry containing a second natural language term;
a language estimation unit configured to identify a first language of the first natural language term in the first data entry and further configured to add an association between a first language tag and the first data entry, where the first language tag is an indication of the first language;
the language estimation unit further configured to identify a second language of the second natural language term in the second data entry and further configured to add an association between a second language tag and the second data entry, where the second language tag is an indication of the second language;
a vocabulary generating unit configured to generate phonetic data associated with each respective media file of the media files, where the phonetic data contains phonetic representations of the first natural language term and the second natural language term based on the first language tag and the second language tag, respectively;
a speech recognition unit configured to receive a natural language voice input representative of a request to select a media file;
a processor configured to select the media file based on a comparison of the natural language voice input with the phonetic data generated for each of the media files based on the respective first and second language tags.

21. The system of claim 20, where data entries in the file identification data of each media file include information selected from the group consisting of an artist of the media file, a title of the media file, a composer of the media file, a recording year of the media file, and a genre of the media file, and combinations of two or more of these.

22. The system of claim 20, where the language estimation unit is configured to identify the first language of the first natural language term in the first data entry based on a statistical model and file identification data of other media files.

23. The system of claim 20, where the language estimation unit is configured to identify the first language of the first natural language term in the first data entry based on a statistical model and content of the second data entry of the file identification data of the media file.

24. A method for automatically detecting the language of file identification data of a media file, the file identification data including a plurality of data fields in a header section of the media file allowing identification of the media file, the method comprising:
receiving, with a processor, a selection of at least one media file out of a group of media files;
retrieving, with the processor, a first data field and a second data field of the data fields in the file identification data;
estimating a first language of the first data field of the file identification data of the media file with the processor based on a statistical model;
estimating a second language of the second data field of the file identification data of the media file with the processor based on the statistical model;
adding, with the processor, the estimated first language and the estimated second language to the file identification data;
linking, with the processor, the estimated first language with the first data field and the estimated second language with the second data field; and
identifying, by the processor, the media file in response to receipt of a voice control command by comparing the voice control command to phonetic data comprising a first phonetic representation of the first data field in the estimated first language and a second phonetic representation of the second data field in the estimated second language.

25. The method of claim 24, where the file identification data include different data sets, at least one data set includes the at least one data entry, and where the natural language is estimated for more than one of the data entries of the file identification data.

26. The method of claim 24, where the natural language of the at least one data entry is determined taking into account file identification data of other media files.

27. The method of claim 26, further comprising:
estimating the natural language for that at least one data entry of each of the other media files;
calculating a score for each estimated natural language, the score indicating a degree to which the file identification data matches the respective estimated natural language.

28. The method of claim 27, where the estimated natural language of the at least one data entry of the media file is estimated based on the calculated score.

29. The method of claim 24, where the natural language of the at least one data entry is determined taking into account file identification data of other data entries of the media file.

30. The method of claim 24, where estimating the natural language includes utilizing a confidence based approach including determining a confidence value for each estimated language, the confidence value being a measure of assuredness that the estimated language of the data entry is the correct language.

31. The method of claim 30, where the natural language of the data entry is estimated based on the determined confidence value.

32. The method of claim 31, where the data files are arranged in accordance with the determined confidence value.

33. The method of claim 24, where the natural language is determined for information included in the language identification data, the information selected from the group consisting of an artist of the media file, a title of the media file, a composer of the media file, a recording year of the media file, a genre of the media file, and combinations of two or more of these.

34. The method of claim 24, where estimating the natural language includes estimating a language of a name of an artist of the media file by determining a language of a title of the media file, and where the determined language of the title is utilized as the language of the name of the artist.

35. The method of claim 24, where estimating the natural language includes determining a language of a name of an artist by:
   identifying other media files of the artist;
   estimating languages of titles of the other identified media files; and
   determining the language of the name of the artist based on the estimated languages of the other media files.

36. The method of claim 24, where estimating the natural language includes determining a language of a title of the media file by:
   identifying an artist of the media file;
   identifying other media files of the artist;
   estimating languages of titles of the other media files of the artist; and
   estimating the language of the title of the media file in correspondence with the estimated languages of the other media files.

37. The method of claim 36, where estimating the languages of the titles of the other media files of the artist includes combining the titles of the other media files into a new title string and estimating the natural language for the new title string, and where the estimated language is utilized as language of the title of the media file.

38. The method of claim 36, where the language most estimated among the languages of the titles of the other media files is utilized as language of the title of the media file.

39. The method of claim 36, where determining the language of the title of the first media file includes determining a score of each estimated language for the titles of the other media files and combining the scores of each estimated language, and where the language with the highest combined score is utilized as language of the title of the media file.

40. The method of claim 24, where the media file is a first media file, the method further comprising: determining a second media file having a particular title and different artists.

41. The method of claim 24, where the estimated natural language is a first estimated natural language, and the at least one data entry is a first data entry, the method further comprising:
   associating, with the processor, the first estimated language with the first data entry;
   retrieving, with the processor, a second data entry of the file identification data;
   estimating a second natural language of the second data entry with the processor based on the statistical model;
   adding the second estimated natural language to the file identification data; and
   associating the second estimated natural language with the second data entry.

* * * * *